No. 624,273. Patented May 2, 1899.
J. D. WALSH.
WIRE STRAINER.
(Application filed Mar. 16, 1898.)
(No Model.)
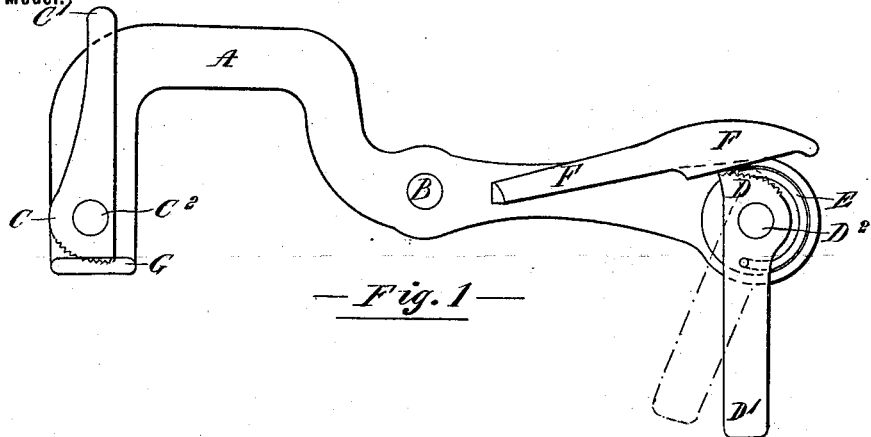
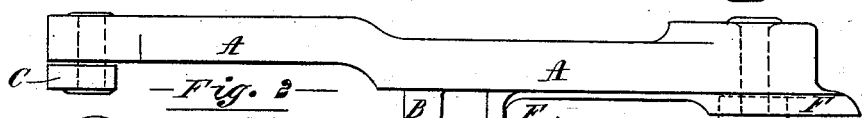
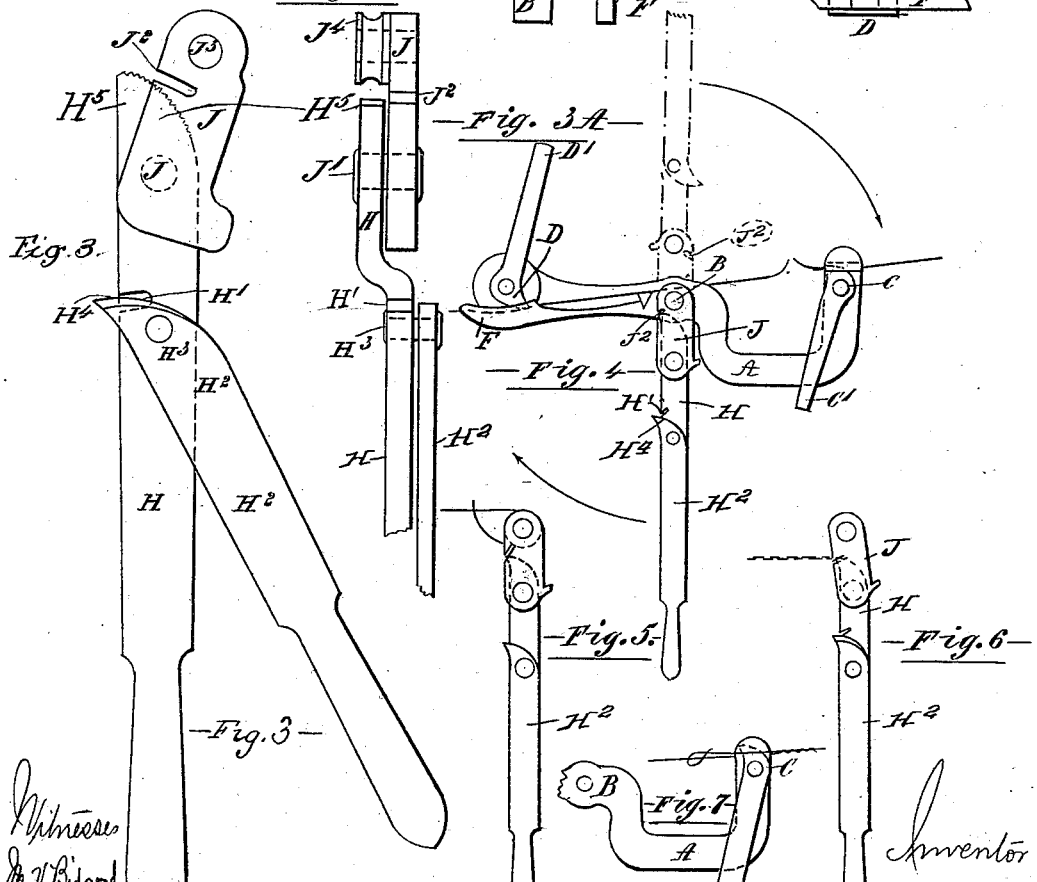

UNITED STATES PATENT OFFICE.

JAMES DANIEL WALSH, OF OTAKIA, NEW ZEALAND.

WIRE-STRAINER.

SPECIFICATION forming part of Letters Patent No. 624,273, dated May 2, 1899.

Application filed March 16, 1898. Serial No. 674,055. (No model.)

*To all whom it may concern:*

Be it known that I, JAMES DANIEL WALSH, a subject of the Queen of Great Britain, residing at Otakia, Otago, in the Colony of New Zealand, have invented an Improved Wire-Strainer, of which the following is a specification.

My invention relates to an improved wire-strainer, the special object of the invention being to provide an appliance whereby fence-wires can be more easily and firmly strained than is the case with the wire-strainers at present in general use. In order to achieve this object, I provide a light cast-iron frame, to which a center pin or fulcrum is molded. At each end of the appliance I arrange an eccentrically-mounted cam-jaw, each cam being formed with teeth on one side and a lever-handle on the opposite side. The eccentric cam at one end is loosely mounted on a pin or fulcrum; but the cam on the opposite end is controlled by a spiral spring. In addition to these parts I provide a lever one end of which is likewise provided with an eccentrically-arranged cam-jaw. A loose extension-plate is attached to the lever and is provided with a hole through which it is intended that the center pin or fulcrum of the cast-iron frame (first mentioned) shall pass. The long end of the lever is provided with a double handle, the duplicated part of the handle being made to revolve upon a pin and to form a cutting tool or shear with a recess on the stationary part of the handle. By gripping the slack wire with the two jaws on the first-mentioned appliance and cutting and twisting the wire in a peculiar manner by the lever I am able to strain a fence-wire to a great tension. In order that my invention may be the better understood, I will now proceed to describe the same in detail by making reference to the accompanying illustrative drawings, in which—

Figure 1 is a side elevation of the principal appliance. Fig. 2 is a plan of same; Figs. 3 and 3$^A$ side and front elevations of the lever and accessories. Figs. 4, 5, 6, and 7 are sketches of the appliance in various positions, on reduced scale, illustrating the method of using my appliance as the work of straining proceeds.

Similar letters of reference are used to denote like parts wherever they occur in the drawings.

A is a principal casting, having a projecting pin or fulcrum B in the middle thereof and an eccentrically-arranged toothed cam or jaw at each end of the casting, as shown at C and D. These cams are provided with handles or levers C' and D', respectively. The cam C revolves loosely upon the pin $C^2$ within certain limits; but the cam D, which revolves upon the pin $D^2$, is controlled by a strong spiral spring E, which is arranged in a recess in the casting and is set in such a manner as to have a tendency to throw the lever D' and parts connected therewith into the position indicated by dotted lines in Fig. 1 of the drawings.

F is a projecting lug upon the main casting for the purpose of guiding and steadying the fence-wire in the desired position. G is also a lug projection on the main casting and is provided for a similar purpose.

Referring now to Figs. 3 and 3$^A$ of the drawings, H is the main lever-handle, which is slotted at H'. To the main lever an auxiliary handle $H^2$ is pivoted on the pin $H^3$, its short end being rounded off, beveled, and sharpened at $H^4$, so as to form a cutting-shear for the wire when the latter is placed in the slot H', as will be well understood. The upper end of the main lever-handle H terminates in an eccentrically-arranged cam-jaw $H^5$. J is a loosely-journaled extension-plate attached to the upper cam end of lever-handle H by the pivot J'. The extension-plate J is provided with a hole $J^3$ of such size as shall constitute a working fit on the pin B, referred to in a former part of the specification. A circumferentially-grooved circular boss $J^4$ is secured to extension-plate J, concentric with the hole $J^3$ and supported opposite to the end $H^5$ of the lever-handle, as will be well understood on reference to Fig. 3$^A$. The method of using my appliance may be briefly described as follows: The operator selects a position about midway between two straining-posts in the fence, and taking the strainer in the right hand, with the cam D toward his left and the cam C toward his right, he places the strainer so that the wire is held at two points by the cam C and by the spring-cam D, the said cams being pressed back by aid of their handles, so that the wire may be inserted between their jaws and the lugs F and G, respectively. The wire is then cut off as close as possible to the cam C, as will be well understood on reference to Fig. 4 of the drawings, the long-lever gear H H² being used as a shear in order to cut the wire. The severed ends of the wire will then be held by the cams C and D. The lever-handle is next journaled upon the main casting by aid of the pin B, which passes into the hole J³, (the lever-handle being in the position shown in broken lines in Fig. 4,) and the wire is gripped by the cam part H⁵ of the lever operating against the recessed boss J⁴. The wire (so far as the lever-handle is concerned) is then bent around the boss J⁴ by operating the handle H H² in the direction shown by the arrows in Fig. 4 and drawn past the spring-clamp D, which allows free movement of the wire in that direction. At this stage of the operation the wire will appear in the position illustrated in Fig. 5. The lever is now pushed back to about a quarter of a revolution, and as the cam part H⁵ of the lever H takes a fresh grip the lever is brought forward again in the direction of the arrow-head, thus drawing the wire farther past the spring-cam D. This operation is repeated as often as necessary, so that the wire is gradually drawn through the cams D and H⁵ until it becomes well strained. While the lever is being traversed backward and forward, the main casting may be kept steady by holding the arm D′ with the left hand. The overlapping wire which has been strained through the cam is next straightened out in front of the cam C and is bent so as to lie parallel with the wire which is held by the said cam, the handle having been removed meanwhile. The two wires are now taken in the slot H′ and are firmly held by the lever-handle, the said handle gripping the wires at about six inches to the right of the cam C when in the position shown in Fig. 4, so that the handle will be out of the way of the casting when the latter is revolved. The operator now steadies the lever-handle against his knee or against one of the adjacent fence-wires and, grasping the cam-handles C′ and D′ in his hands, turns the main casting away from himself, taking care that the wire which is held by the cam C is entered first into the slot. When the twisting operation has been completed, the lever-handle is removed and the cam-handles C′ and D′ are knocked back and the wire ends are found to be perfectly strained and joined. Should the wire it is intended to strain be very brittle, the splice illustrated in Fig. 7 of the drawings can be substituted for those already described and is made by cutting the wire about two and a half inches from the cam C, looping the end around the wire held by the cam D, (similar to half an ordinary wire knot,) taking the latter over the cam C and turning it around the wire held by the latter by the assistance of the handle. The strainer is then removed from the wire by releasing the cams.

Having now particularly described and ascertained the nature of my said invention and in what manner the same is to be performed, I declare that what I claim is—

1. In a wire strainer or stretcher, the combination of a suitable frame, and wire-clamps supported by said frame, a lever-handle having a clamp end H⁵, an extension-plate J journaled to the lever-handle adjacent to its cam end and supporting a grooved boss J⁴, substantially as set forth.

2. In a wire strainer or stretcher, the combination of a suitable frame supporting two opposite operating wire-clamping devices, a fulcrum such as B upon the frame between the clamping devices, a lever H formed with a cam end H⁵, an extension-plate J journaled to the lever H adjacent to its cam end and formed with a journal hole or opening J³ and a grooved boss J⁴, said extension-plate being adapted to be journaled upon the fulcrum B, substantially as and for the purposes set forth.

In testimony whereof I have signed this specification in the presence of two subscribing witnesses.

JAMES DANIEL WALSH.

Witnesses:
A. J. PARK,
J. R. PARK.